US 6,639,788 B1

(12) United States Patent
Liao et al.

(10) Patent No.: US 6,639,788 B1
(45) Date of Patent: Oct. 28, 2003

(54) COMPUTER PROVIDED WITH DISPLAY OF INDIFFERENT EQUILIBRIUM

(75) Inventors: Hung-Ta Liao, Taipei (TW); Ku-Feng Chen, Taipei Hsien (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 09/375,684

(22) Filed: Aug. 17, 1999

(30) Foreign Application Priority Data

Aug. 26, 1998 (TW) .................................... 87214026 U

(51) Int. Cl.$^7$ ................................................ G06F 1/16

(52) U.S. Cl. .................. 361/681; 361/682; 248/292.14; 345/659

(58) Field of Search ................................ 361/681, 682, 361/683, 724–727; 248/121.1, 124.1, 125.1, 292.14, 185.1, 278.1, 917–923, 242.14; 345/654, 659; 312/223.1–223.6, 294; 267/64–69

(56) References Cited

U.S. PATENT DOCUMENTS

| 4,025,017 A | * | 5/1977 | Miller .................... 248/297.11 |
| 4,616,218 A | * | 10/1986 | Bailey et al. ................ 361/682 |
| 4,768,762 A | * | 9/1988 | Lund ........................... 267/172 |
| 5,329,289 A | * | 7/1994 | Sakamoto et al. ........... 345/659 |
| 6,189,850 B1 | * | 2/2001 | Liao et al. .............. 248/292.14 |
| 6,233,139 B1 | * | 5/2001 | Hamon ......................... 361/681 |
| 6,338,464 B1 | * | 1/2002 | Jen-Hsiang ................. 219/755 |

FOREIGN PATENT DOCUMENTS

| EP | 410108104 A | * | 11/1986 | ........... F16M/11/24 |
| JP | 0183938 A1 | * | 4/1998 | ............ H04N/5/64 |

* cited by examiner

Primary Examiner—Michael Datskovsky
(74) Attorney, Agent, or Firm—Darby & Darby

(57) ABSTRACT

A computer provided with a display of indifferent equilibrium. The computer includes a mainframe, a display and a constant-force spring. The display movably is supported by the mainframe. The constant-force spring is simultaneously connected to the mainframe and the display, while the weight of the display is equal to the restoring force of the constant-force spring.

5 Claims, 8 Drawing Sheets

COMPUTER PROVIDED WITH DISPLAY OF INDIFFERENT EQUILIBRIUM

BACKGROUND OF THE INVENTION

1. Field of the Invention:

The present invention relates in general to a computer provided with a display of indifferent equilibrium.

2. Description of the Related Art:

FIG. 5 is a side view of a computer provided with a TFT liquid crystal display according to the prior art, wherein the display 52 is supported by a mainframe 51.

The display 52 can be rotated from a horizontal direction (FIG. 6a) to a vertical direction (FIG. 6b). In such an operation, the display 52 is lifted as indicated by arrow A and then rotated as indicated by arrow B. If the user carelessly releases the display 52 during the lifting process, then the display 52 will drop and collide with other parts. The computer could possibly get damaged.

SUMMARY OF THE INVENTION

An object of the present invention is to provide a computer having a display of indifferent equilibrium. The display does not drop if the user carelessly releases the display.

The computer of the present invention includes a mainframe, a display and a constant-force spring. The display is movably supported by the mainframe. The constant-force spring is simultaneously connected to the mainframe and the display, while the weight of the display is equal to the restoring force of the constant-force spring. Therefore, the display does not drop if the user carelessly releases the display.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
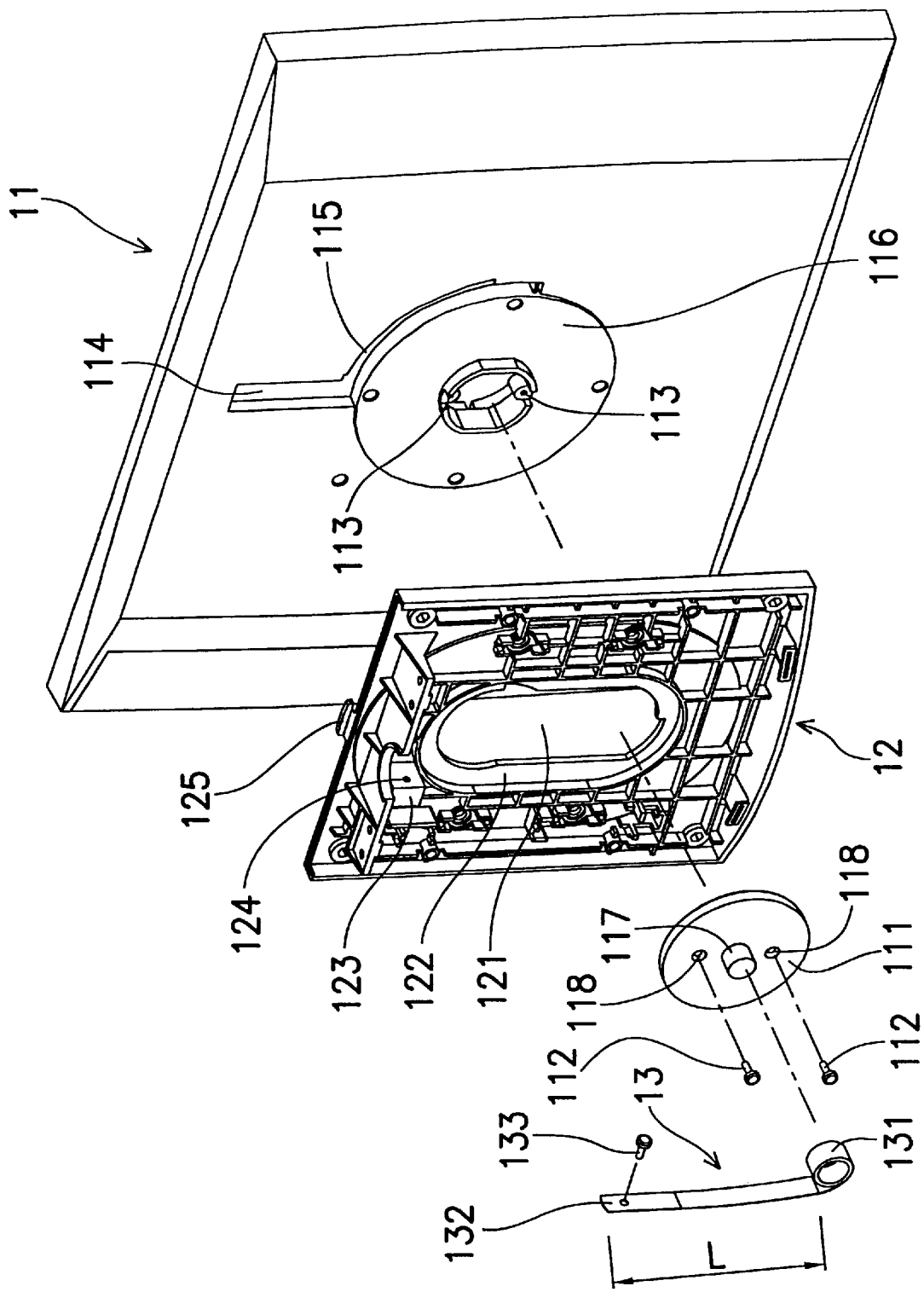
FIG. 1 is a perspective exploded diagram of the computer in accordance with the present invention.

Referring to FIG. 1, a computer in accordance with the present invention includes a display 11, a constant-force spring 13 and a mainframe. For easy description, only a part of the mainframe, mainframe cover 12, is shown.

The back of the display 11 is provided with a round connecting portion 116, a straight slot 114 and a curved slot 115. The straight slot 114 extends toward the center of the round connecting portion 116. The curved slot 115 extends from the rims of the round connecting portion 116 and connects to the straight slot 114. On the connecting portion 116 are provided two threaded holes 113. Furthermore, the display 11 includes a connecting disk 111 with a post 117 and two holes 118 provided thereon.

A slider 125 protrudes from an edge of the mainframe cover 12. The mainframe cover 12 has a through opening 121, surrounding which is contact area 122. Beside the contact area 122 is a fixing member 123. A screw hole 124 is provided on the fixing member 123.

Figure 2:
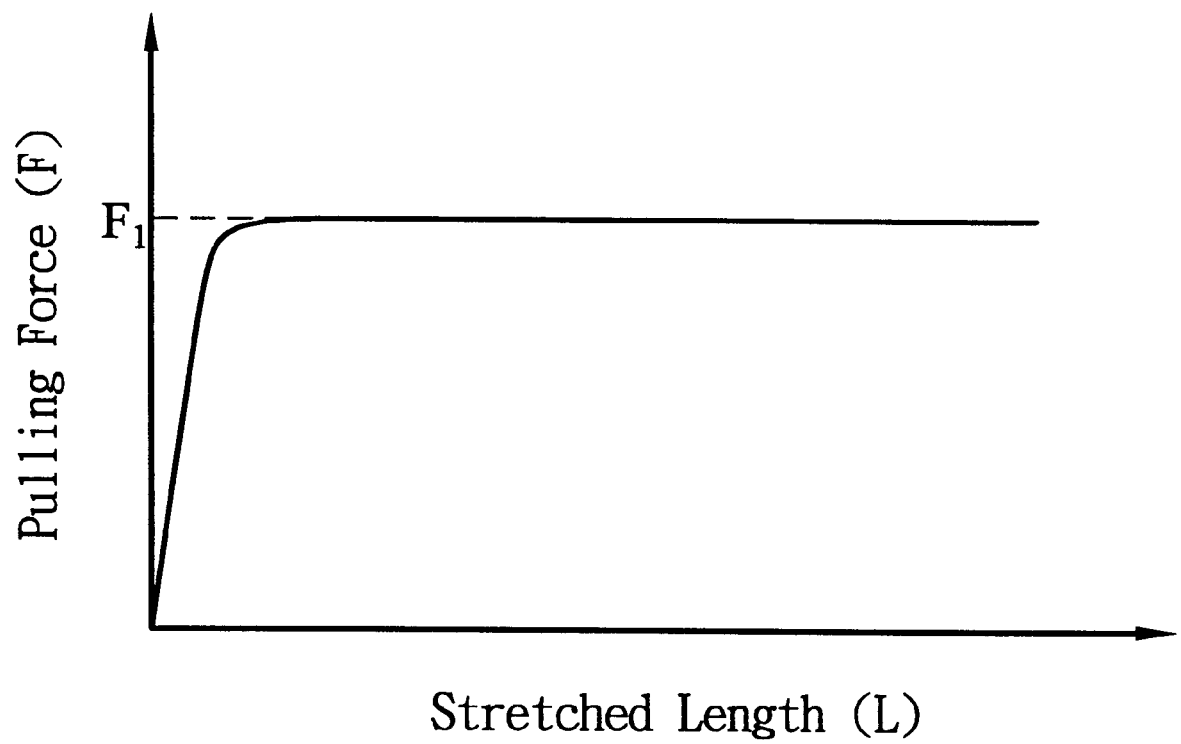
FIG. 2 is a force-length diagram of a constant-force spring.

The constant-force spring 13 has a coiled portion 131 and an end 132 to which an external pulling force is applied. FIG. 2 shows a force-length curve of the constant-force spring, wherein the pulling force (F) is an external force applied to the end 132 of the spring 13. It is noted that the stretched length (L) of the spring is not a length deformation. Instead, the stretched length is a total length of the spring under the pulling force, as indicated by "L" of FIG. 1. It is understood from FIG. 2 that the stretched length can be arbitrarily changed within a limited range when the pulling force is $F_1$. That is, the restoring force of the spring is equal to the external pulling force $F_1$ regardless of the stretched length of the spring. This feature of the constant-force spring is used in the present invention. The weight of the display 11 is set at $F_1$, which is always equal to the restoring force of the spring.

Figure 3:
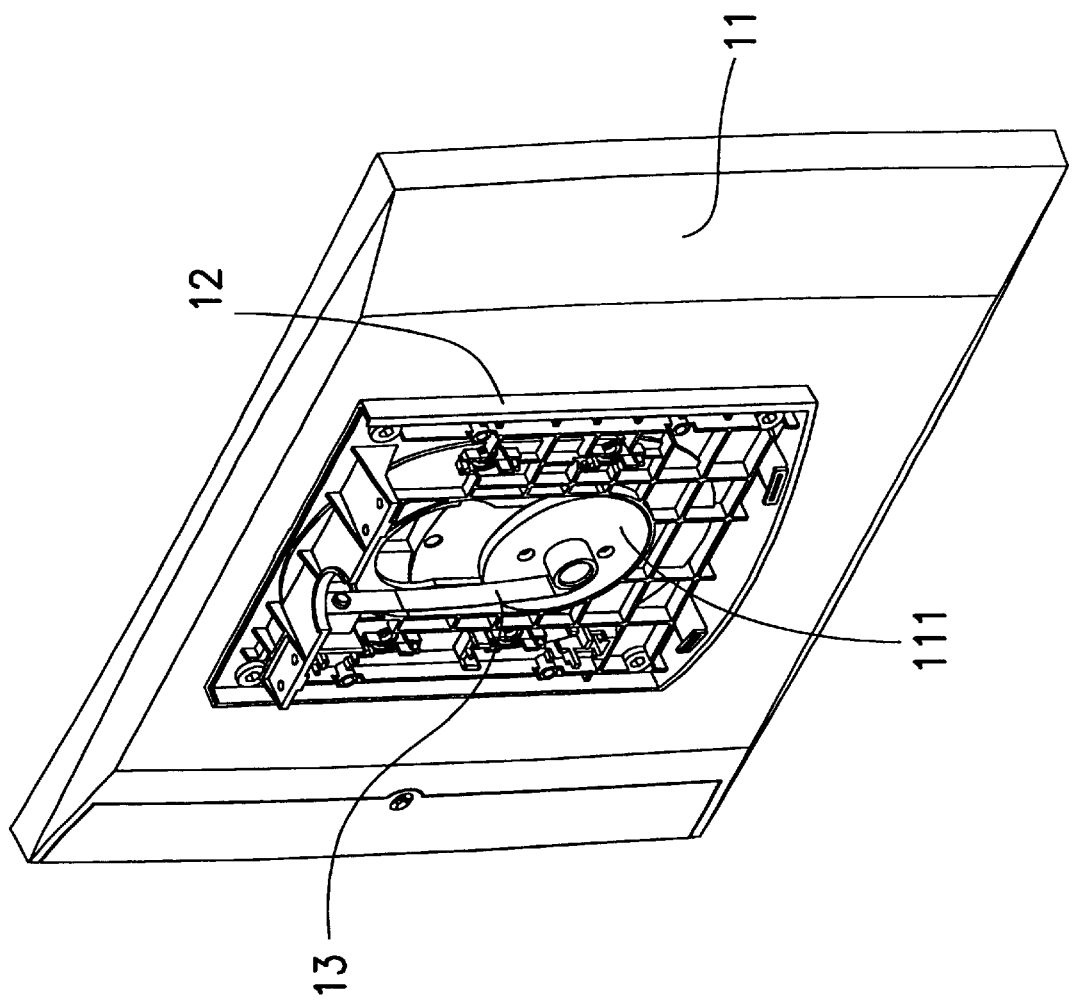
FIG. 3 is an assembly diagram of the computer of FIG. 1

Assembling the display of indifferent equilibrium is now described. The slider 125 of the mainframe cover 12 is inserted into the connecting space where the straight slot 114 connects to the curved slot 115, and is pushed into the straight slot 114 therefrom. Then, screws 112 are driven into the threaded holes 113 of the display 11 through the holes 118 of the connecting disk 111. The connecting disk 111 is thus in contact with the contact area 122 of the mainframe cover 12. Then, the end 132 of the constant-force spring 13 is fastened to the fixing member 123 via the screw 133 and the threaded hole 124. The coiled portion 131 of the constant-force spring 13 is put around the post 117, as shown in FIG. 3.

Figure 4A:
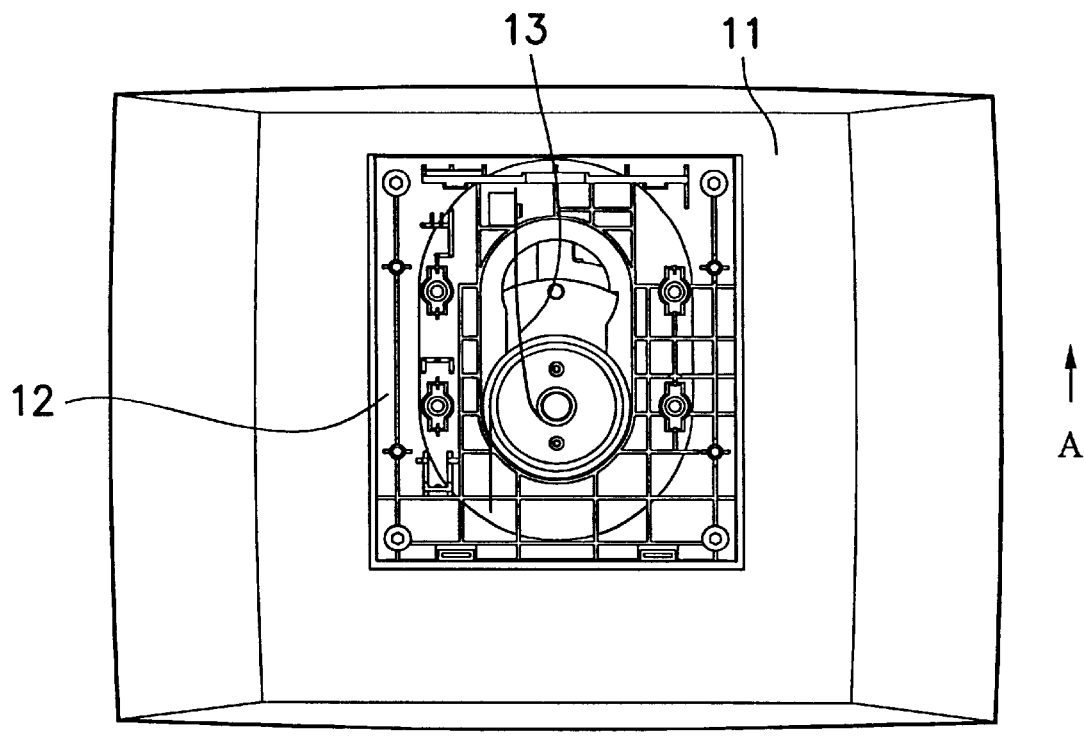
FIGS. 4a–4d depict how the display of the computer of the present invention is lifted and rotated.
Figure 4B:
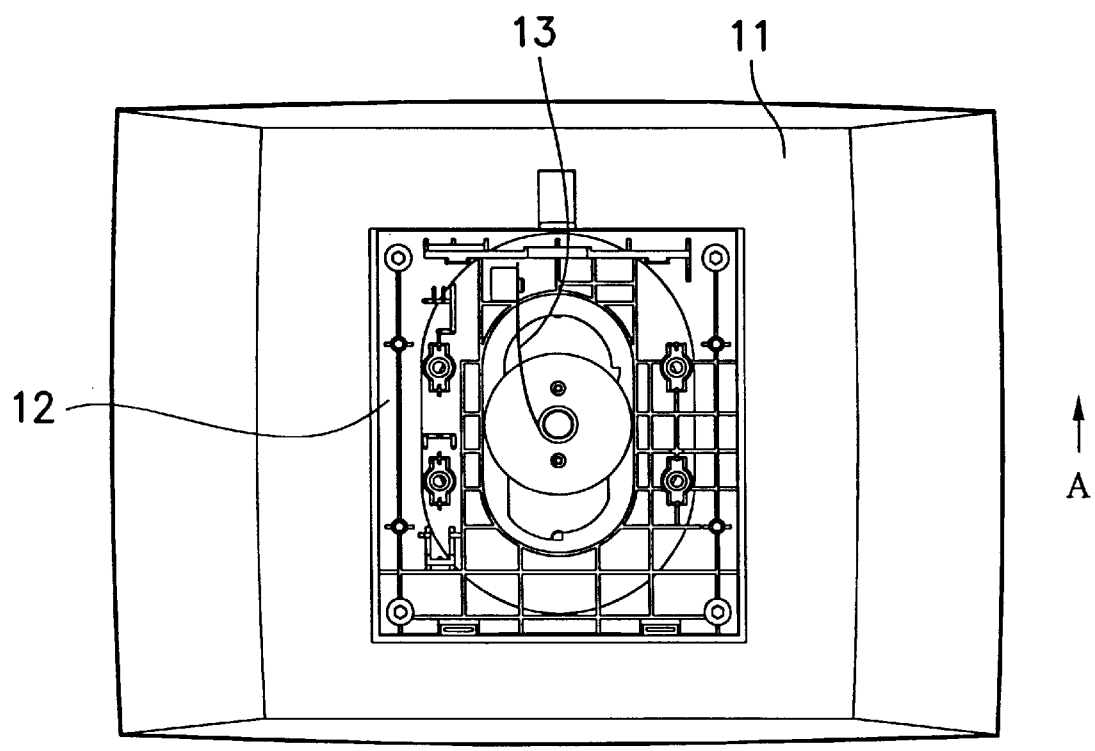
Figure 4C:
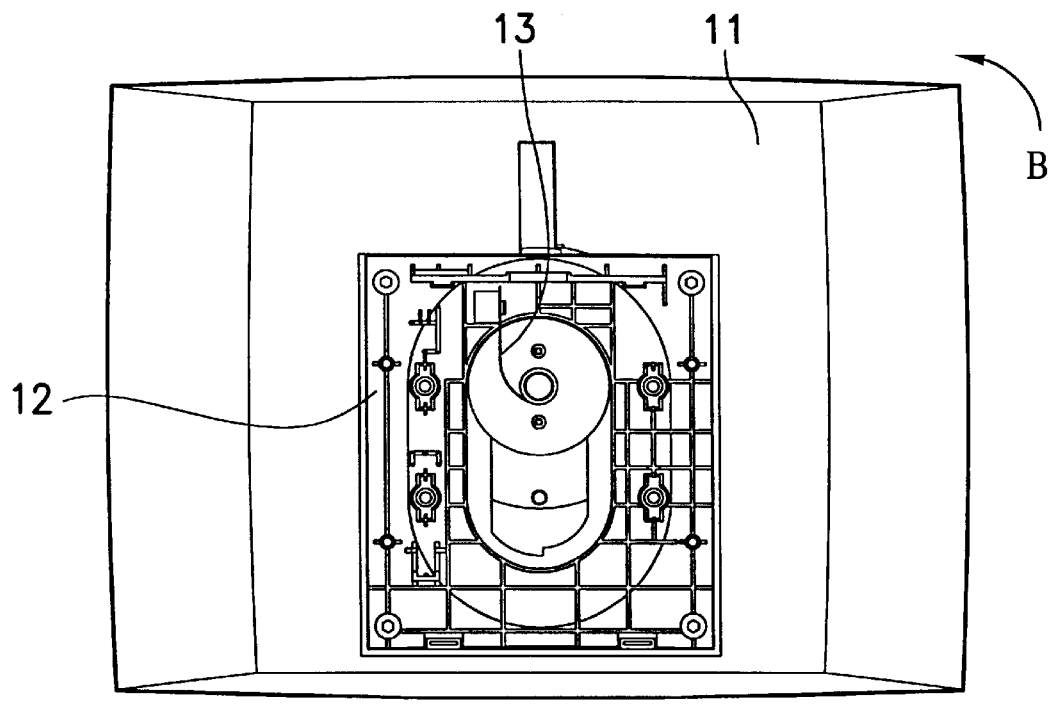
Figure 4D:
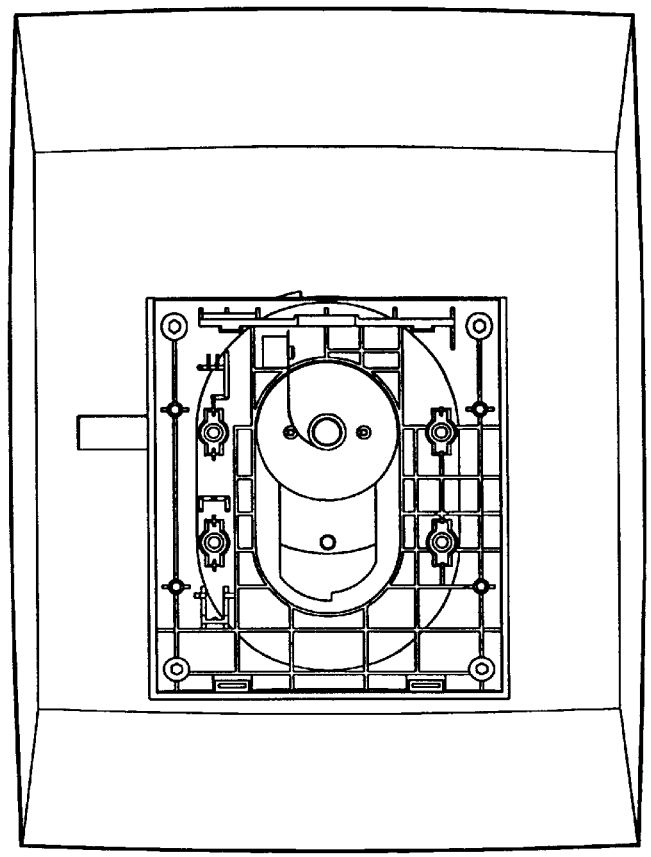
Figure 5:
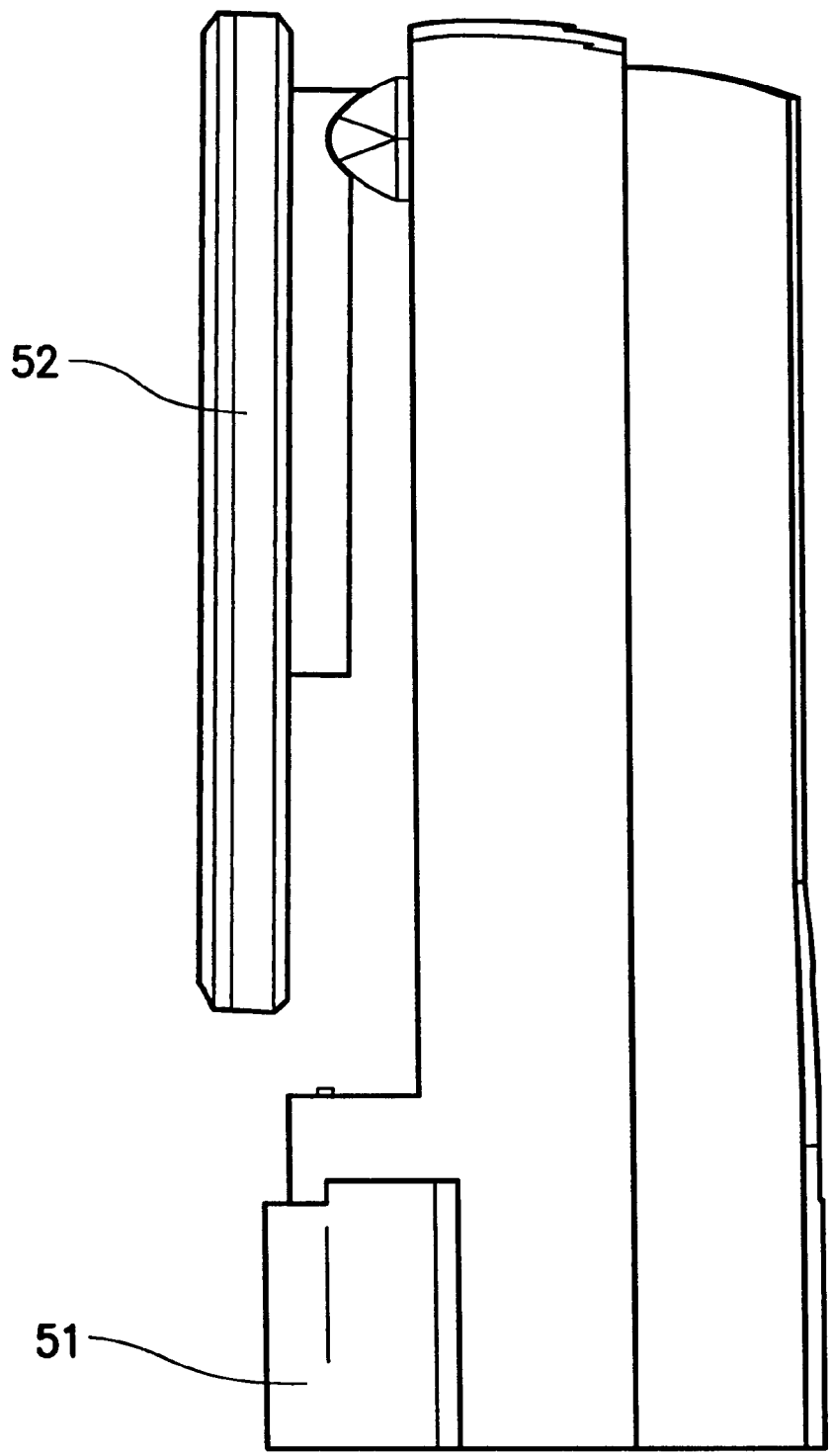
FIG. 5 is a side view of a computer provided with a TFT liquid crystal display according to the prior art.
Figure 6A:
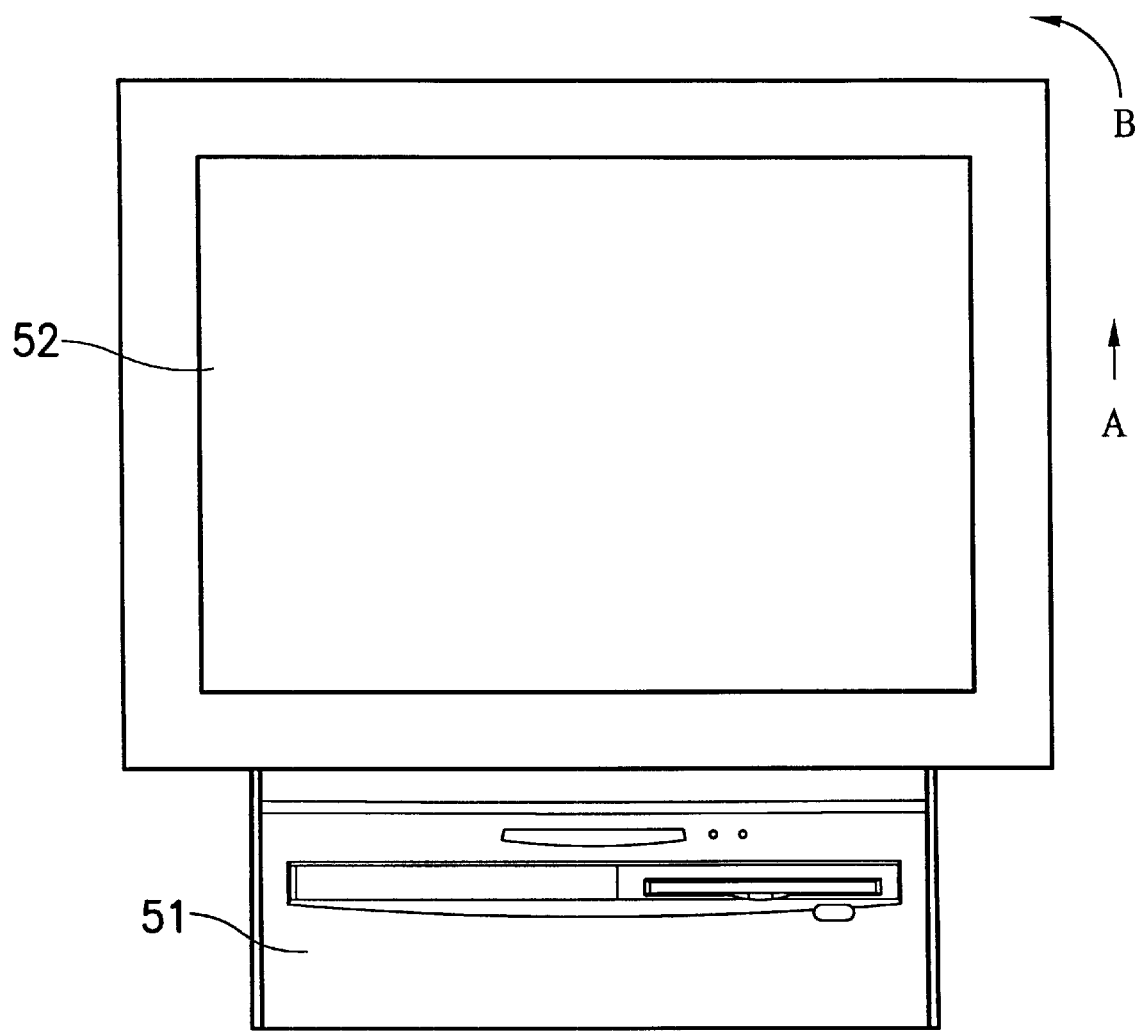
FIGS. 6a–6b depict how the TFT liquid crystal display of FIG. 5 is rotated.
Figure 6B:
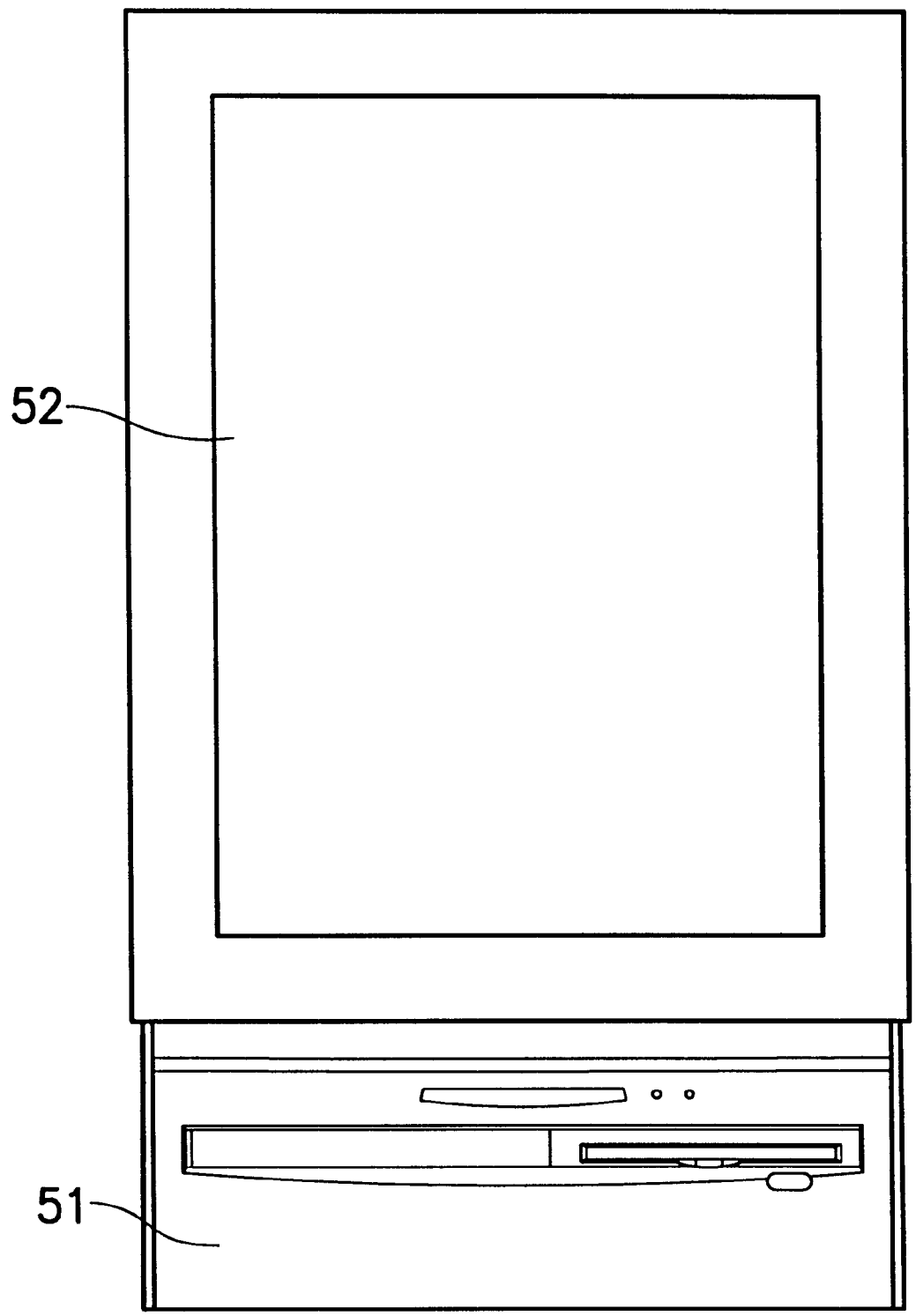

FIGS. 4a–4d depict how the arrangement of the display of the present invention is changed. Referring to FIG. 4a, the display 11 is horizontally arranged, a normal use situation. The restoring force of the constant-force spring 13 is equal to the weight of the display 11. If the user wishes to change the arrangement of the display 11 from the horizontal direction to the vertical direction, then he lifts the display 11 as indicated by arrow A. FIG. 4b shows the lifting process, in which the stretched length of the constant-force spring is reduced. However, the restoring force of the constant-force spring remains unchanged (i.e. the restoring force is equal to the weight of the display) Therefore, the display 11 does not drop if the user carelessly releases the display 11. Then, the display 11 is lifted to the top position as shown in FIG. 4c. The restoring force of the constant-force spring is still equal to the weight of the display. Then, the user rotates the display 11 as indicated by arrow B. FIG. 4d shows the changed arrangement of the display.

In the process of FIGS. 4a–4c, the slider 125 of the mainframe cover 12 is moved in the straight slot 114 of the display 11. In the processes of FIGS. 4c–4d, the slider 125 of the mainframe cover 12 is rotated in the curved slot 115 of the display 11.

It is noted that the restoring force of the constant-force spring 13 is equal to the weight of the display 11 throughout the lifting process (FIGS. 4a–4c). Therefore, the display 11 does not drop if the user carelessly releases the display 11. The problem of the prior art is solved.

The embodiment described above is an application of the present invention to computers. It is understood that the present invention is also applicable to other apparatuses in addition to computers. For example, an apparatus includes a first element and a second element movably supported by the first element. A constant-force spring is used to connect the first element and the second element so that a weight of the second element is always equal to a restoring force of the constant-force spring. By this arrangement, the second element is in indifferent equilibrium.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer, comprising:

a mainframe;

a display movably supported by the mainframe; and a constant-force spring simultaneously connected to the mainframe and the display, wherein a weight of the display is always equal to a restoring force of the constant-force spring, the display has a post, and the constant-force spring has an end fasted to the mainframe and a coiled portion positioned around the post of the display.

2. A computer as claimed in claim 1, wherein the mainframe has a contact area, the display further has a connecting disk on which the post is provided, and the connecting disk of the display is movably in contact with the contact area of the mainframe.

3. A computer as claimed in claim 2, wherein the mainframe further has a fixing member provided beside the contact area, and the end of the constant-force spring is fastened to the fixing member.

4. A computer, comprising:

a mainframe;

a display movably supported by the mainframe; and a constant-force spring simultaneously connected to the mainframe and the display, wherein a weight of the display is always equal to a restoring force of the constant-force spring, the display has a straight slot, the mainframe has a slider movably constrained in the straight slot, and the slider is moved in the straight slot when the display is moved with respect to the mainframe.

5. A computer as claimed in claim 4, wherein the display further has a curved slot connected to the straight slot and the slider is rotated in the curved slot when the display is rotated with respect to the mainframe.

* * * * *